US012770770B2

(12) United States Patent
Ookawa et al.

(10) Patent No.: US 12,770,770 B2
(45) Date of Patent: Oct. 20, 2026

(54) ELECTRONIC COMPONENT

(71) Applicant: Murata Manufacturing Co., Ltd., Nagaokakyo (JP)

(72) Inventors: Noriyuki Ookawa, Nagaokakyo (JP); Eiji Iso, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 539 days.

(21) Appl. No.: 18/503,717

(22) Filed: Nov. 7, 2023

(65) Prior Publication Data

US 2024/0071672 A1 Feb. 29, 2024

Related U.S. Application Data

(63) Continuation of application No. PCT/JP2022/015952, filed on Mar. 30, 2022.

(30) Foreign Application Priority Data

Jun. 15, 2021 (JP) ................................. 2021-099717

(51) Int. Cl.
*H01F 27/02* (2006.01)
*H01F 27/25* (2006.01)
*H01F 27/255* (2006.01)
*H01F 37/00* (2006.01)

(52) U.S. Cl.
CPC ......... *H01F 27/022* (2013.01); *H01F 27/255* (2013.01); *H01F 37/00* (2013.01)

(58) Field of Classification Search
CPC ....... H01F 27/022; H01F 27/255; H01F 37/00
See application file for complete search history.

(56) References Cited

U.S. PATENT DOCUMENTS

| | | | | |
|---|---|---|---|---|
| 2017/0076870 | A1* | 3/2017 | Noda | H01G 4/232 |
| 2018/0182537 | A1* | 6/2018 | Shimizu | H01F 27/29 |
| 2020/0402714 | A1* | 12/2020 | Yoon | H01G 2/065 |

FOREIGN PATENT DOCUMENTS

| | | | | |
|---|---|---|---|---|
| JP | H08-064427 | A | | 3/1996 |
| JP | 2005005412 | A | | 1/2005 |
| JP | 2017130572 | A | * | 7/2017 |
| JP | 2018107346 | A | | 7/2018 |
| JP | 2021048320 | A | * | 3/2021 |

OTHER PUBLICATIONS

Japanese Patent Office—Decision to Grant a Patent (Translated) Jun. 25, 2024 (Year: 2024).*
International Search Report in PCT/JP2022/015952, mailed May 31, 2022, 3 pages.

* cited by examiner

*Primary Examiner* — Malcolm Barnes
(74) *Attorney, Agent, or Firm* — ArentFox Schiff LLP

(57) ABSTRACT

An electronic component that includes a base body and insulating film covering an outer surface of the base body. The outer surface has a first boundary surface including a curved surface that is present at a boundary between a first surface and a second surface of the outer surface. An inner angle of the base body among angles formed by the first surface and the second surface is less than 180 degrees. The average value of a thickness dimension from the first boundary surface to the surface of an insulating film portion covering the first boundary surface is greater than the average value from the first surface to the surface of an insulating film portion covering the first surface in the thickness direction.

12 Claims, 4 Drawing Sheets

ELECTRONIC COMPONENT

CROSS REFERENCE TO RELATED APPLICATIONS

The present application is a continuation of International application No. PCT/JP2022/015952, filed Mar. 30, 2022, which claims priority to Japanese Patent Application No. 2021-099717, filed Jun. 15, 2021, the entire contents of each of which are incorporated herein by reference.

TECHNICAL FIELD

The present invention relates to an electronic component.

BACKGROUND ART

The method of manufacturing an electronic component described in Patent Document 1 forms an insulating film covering the outer surface of a base body. At this time, the insulating film is formed so as to cover the entire range of the outer surface of the base body. In addition, the thickness of the insulating film is entirely uniform immediately after the insulating film is formed.

Patent Document 1: Japanese Unexamined Patent Application Publication No. 2005-005412

SUMMARY OF THE INVENTION

An electronic component as described in Patent Document 1 often collides with jigs, other components, or the like in a manufacturing process after the insulating film is formed on the outer surface of the base body. In addition, the electronic component may collide with other objects while the electronic component is stored and transported after being manufactured. When the electronic component is subjected to an impact as described above, not only is the insulating film damaged, but the base body may also sustain damage such as chips and cracks.

To solve the problem described above, according to the present invention, there is provided an electronic component including: a base body; and an insulating film covering an outer surface of the base body, in which the outer surface has a first surface that is planar, a second surface that is adjacent to the first surface and extends in a direction different from a direction of the first surface, and a boundary surface including a curved surface at a boundary between the first surface and the second surface, an inner angle of the base body among angles formed by the first surface and the second surface is less than 180 degrees, and a first average dimension is greater than a second average dimension in a cross section orthogonal to the first surface and the second surface, wherein the first average dimension is an average value of a thickness dimension from the boundary surface to a surface of a first part of insulating film that covers the boundary surface, and the second average dimension is an average value of a thickness dimension from the first surface to a surface of a second part of the insulating film that covers the first surface.

In the structure described above, an outer surface portion of the insulating film that covers the boundary surface is more likely to collide with other objects, such as jigs or other electronic components, than an outer surface portion of the insulating film that covers the first surface. In the structure described above, the first average dimension, which is the thickness of the portion covering the boundary surface, is greater than the second average dimension, which is the thickness of the portion covering the first surface. Accordingly, the protective effect of the insulating film on the boundary surface is greater than the protective effect of the insulating film on the first surface. Therefore, even when the outer surface portion of the insulating film that covers the boundary surface collides with another object, the impact force does not easily reach the base body. As a result, the boundary surface of the base body can be suppressed from being damaged.

Damage to the base body, such as chips and cracks, can be suppressed from occurring.

DETAILED DESCRIPTION OF THE PREFERRED EMBODIMENTS

<Electronic Component According to an Embodiment>

Figure 1:
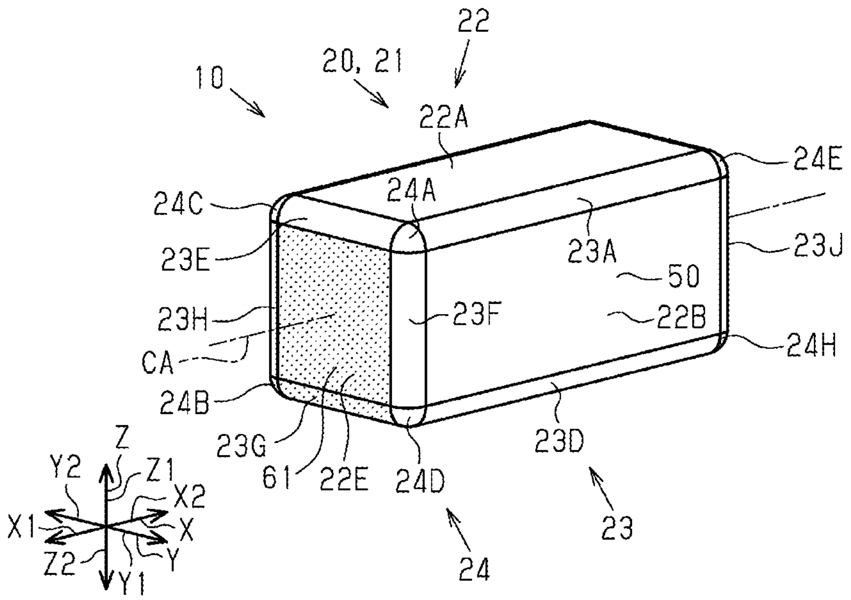
FIG. 1 is a perspective view of an electronic component.

An electronic component according to an embodiment will be described below with reference to the drawings. It should be noted that constituent elements may be enlarged in the drawings to facilitate understanding. The dimensional ratios of components may differ from those in other drawings.

(Overall Structure)

As illustrated in FIG. 1, an electronic component 10 is, for example, a surface mount power inductor component mounted on a circuit board or the like. It should be noted that a power inductor component is an electronic component used for the power supply circuit of a DC-to-DC converter or the like.

The electronic component 10 has a base body 20. The base body 20 has a substantially quadrangular prism shape and a central axis CA passing therethrough. It should be noted that the axis extending parallel to the central axis CA is defined as a first axis X. In addition, one axis orthogonal to the first axis X is defined as a second axis Y. The axis orthogonal to the first axis X and the second axis Y is defined as a third axis Z. One of the directions parallel to the first axis X is defined as a first positive direction X1, and the direction opposite to the first positive direction X1 of the directions parallel to the first axis X is defined as a first negative direction X2. In addition, one of the directions parallel to the second axis Y is defined as a second positive direction Y1, and the direction opposite to the second positive direction Y1 of the directions parallel to the second axis Y is defined as a second negative direction Y2. Furthermore, one of the directions parallel to the third axis Z is defined as a third positive direction Z1, and the direction opposite to the third positive direction Z1 of the directions parallel to the third axis Z is defined as a third negative direction Z2.

An outer surface 21 of the base body 20 includes six planar surfaces 22. The six surfaces 22 extend in directions that differ from each other. These six surfaces 22 are identified as a first surface 22A, a second surface 22B, a third surface 22C, a fourth surface 22D, a fifth surface 22E, and a sixth surface 22F.

The first surface 22A is a plane orthogonal to the third axis Z. In addition, the first surface 22A faces the third positive direction Z1. Accordingly, the first surface 22A extends in the directions of the first axis X and the second axis Y. That is, the first surface 22A extends parallel to the first axis X.

The second surface 22B is a plane orthogonal to the second axis Y. In addition, the second surface 22B faces the second positive direction Y1. Accordingly, the second surface 22B extends in the directions of the first axis X and the third axis Z. That is, the second surface 22B extends parallel to the first axis X. In addition, the inner angle of the base body 20 among the angles formed by the second surface 22B and the first surface 22A is 90 degrees.

Figure 2:
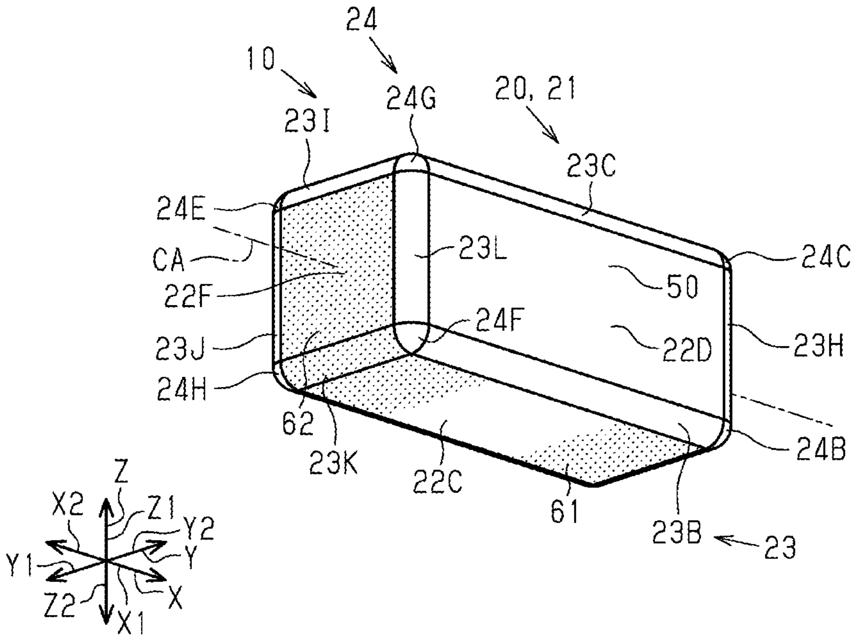
FIG. 2 is a perspective view of the electronic component.

As illustrated in FIG. 2, the third surface 22C is a plane orthogonal to the third axis Z. In addition, the third surface 22C faces the third negative direction Z2. Accordingly, the third surface 22C extends in the directions of the first axis X and the second axis Y. In addition, the third surface 22C is parallel to the first surface 22A. That is, the third surface 22C extends parallel to the first axis X. In addition, the inner angle of the base body 20 among the angles formed by the third surface 22C and the second surface 22B is 90 degrees.

The fourth surface 22D is a plane orthogonal to the second axis Y. In addition, the fourth surface 22D faces the second negative direction Y2. Accordingly, the fourth surface 22D extends in the directions of the first axis X and the third axis Z. In addition, the fourth surface 22D is parallel to the second surface 22B. That is, the fourth surface 22D extends parallel to the first axis X. In addition, the inner angle of the base body 20 among the angles formed by the fourth surface 22D and the third surface 22C is 90 degrees. Furthermore, the inner angle of the base body 20 among the angles formed by the first surface 22A and the fourth surface 22D is 90 degrees.

As illustrated in FIG. 1, the fifth surface 22E is a plane orthogonal to the first axis X. In addition, the fifth surface 22E faces the first positive direction X1. Accordingly, the fifth surface 22E extends in the directions of the second axis Y and the third axis Z. In addition, the inner angles of the base body 20 among the angles formed by the fifth surface 22E and the first to fourth surfaces 22A to 22D are all 90 degrees.

As illustrated in FIG. 2, the sixth surface 22F is a plane orthogonal to the first axis X. In addition, the sixth surface 22F extends in the first negative direction X2. Accordingly, the sixth surface 22F extends in the directions of the second axis Y and the third axis Z. In addition, the inner angles of the base body 20 among the angles formed by the sixth surface 22F and the first to fourth surfaces 22A to 22D are all 90 degrees.

As illustrated in FIG. 1, the outer surface 21 of the base body 20 has 12 boundary surfaces 23. Each of the boundary surfaces 23 includes a curved surface that is present at the boundary between adjacent surfaces 22. That is, the boundary surface 23 includes a curved surface formed by, for example, R-chamfering the vertices formed between the adjacent surfaces 22.

The 12 boundary surfaces 23 are identified as a first boundary surface 23A, a second boundary surface 23B, . . . , and a twelfth boundary surface 23L.

The first boundary surface 23A is the boundary portion between the first surface 22A and the second surface 22B. Accordingly, the first surface 22A and the second surface 22B are adjacent to each other with the first boundary surface 23A therebetween. In addition, the first boundary surface 23A extends parallel to the first axis X. The first boundary surface 23A has a curved portion in sectional view orthogonal to the first axis X. The curved portion extends like an arc equidistant from a particular point.

As illustrated in FIG. 2, the second boundary surface 23B is the boundary portion between the third surface 22C and the fourth surface 22D. Accordingly, the third surface 22C and the fourth surface 22D are adjacent to each other with the second boundary surface 23B therebetween. In addition, the second boundary surface 23B extends parallel to the first axis X. The second boundary surface 23B has a curved portion in sectional view orthogonal to the first axis X. The curved portion extends like an arc equidistant from a particular point.

A third boundary surface 23C is the boundary portion between the first surface 22A and the fourth surface 22D. Accordingly, the first surface 22A and the fourth surface 22D are adjacent to each other with the third boundary surface 23C therebetween. In addition, the third boundary surface 23C extends parallel to the first axis X. The third boundary surface 23C has a curved portion in sectional view orthogonal to the first axis X. The curved portion extends like an arc equidistant from a particular point.

As illustrated in FIG. 1, a fourth boundary surface 23D is the boundary portion between the second surface 22B and the third surface 22C. Accordingly, the second surface 22B and the third surface 22C are adjacent to each other with the fourth boundary surface 23D therebetween. In addition, the fourth boundary surface 23D extends parallel to the first axis X. The fourth boundary surface 23D has a curved portion in sectional view orthogonal to the first axis X. The curved portion extends like an arc equidistant from a particular point.

A fifth boundary surface 23E is the boundary portion between the first surface 22A and the fifth surface 22E. Accordingly, the first surface 22A and the fifth surface 22E are adjacent to each other with the fifth boundary surface 23E therebetween. In addition, the fifth boundary surface 23E extends parallel to the second axis Y. The fifth boundary surface 23E has a curved portion in sectional view orthogonal to the second axis Y. The curved portion extends like an arc equidistant from a particular point.

A sixth boundary surface 23F is the boundary portion between the second surface 22B and the fifth surface 22E. Accordingly, the second surface 22B and the fifth surface 22E are adjacent to each other with the sixth boundary surface 23F therebetween. In addition, the sixth boundary surface 23F extends parallel to the third axis Z. The sixth boundary surface 23F has a curved portion in sectional view orthogonal to the third axis Z. The curved portion extends like an arc equidistant from a particular point.

A seventh boundary surface 23G is the boundary portion between the third surface 22C and the fifth surface 22E. Accordingly, the third surface 22C and the fifth surface 22E are adjacent to each other with the seventh boundary surface 23G therebetween. In addition, the seventh boundary surface 23G extends parallel to the second axis Y. The seventh boundary surface 23G has a curved portion in sectional view orthogonal to the second axis Y. The curved portion extends like an arc equidistant from a particular point.

An eighth boundary surface 23H is the boundary portion between the fourth surface 22D and the fifth surface 22E. Accordingly, the fourth surface 22D and the fifth surface 22E are adjacent to each other with the eighth boundary surface 23H therebetween. In addition, the eighth boundary surface 23H extends parallel to the third axis Z. The eighth boundary surface 23H has a curved portion in sectional view orthogonal to the third axis Z. The curved portion extends like an arc equidistant from a particular point.

As illustrated in FIG. 2, a ninth boundary surface 23I is the boundary portion between the first surface 22A and the sixth surface 22F. Accordingly, the first surface 22A and the sixth surface 22F are adjacent to each other with the ninth boundary surface 23I therebetween. In addition, the ninth boundary surface 23I extends parallel to the second axis Y. The ninth boundary surface 23I has a curved portion in sectional view orthogonal to the second axis Y. The curved portion extends like an arc equidistant from a particular point.

A tenth boundary surface 23J is the boundary portion between the second surface 22B and the sixth surface 22F. Accordingly, the second surface 22B and the sixth surface 22F are adjacent to each other with the tenth boundary surface 23J therebetween. In addition, the tenth boundary surface 23J extends parallel to the third axis Z. The tenth boundary surface 23J has a curved portion in sectional view orthogonal to the third axis Z. The curved portion extends like an arc equidistant from a particular point.

An eleventh boundary surface 23K is the boundary portion between the third surface 22C and the sixth surface 22F. Accordingly, the third surface 22C and the sixth surface 22F are adjacent to each other with the eleventh boundary surface 23K therebetween. In addition, the eleventh boundary surface 23K extends parallel to the second axis Y. The eleventh boundary surface 23K has a curved portion in sectional view orthogonal to the second axis Y. The curved portion extends like an arc equidistant from a particular point.

A twelfth boundary surface 23L is the boundary portion between the fourth surface 22D and the sixth surface 22F. Accordingly, the fourth surface 22D and the sixth surface 22F are adjacent to each other with the twelfth boundary surface 23L therebetween. In addition, the twelfth boundary surface 23L extends parallel to the third axis Z. The twelfth boundary surface 23L has a curved portion in sectional view orthogonal to the third axis Z. The curved portion extends like an arc equidistant from a particular point.

In addition, as illustrated in FIG. 1, the outer surface 21 of the base body 20 has eight spherical corner surfaces 24. Each of the corner surfaces 24 is the boundary portion among the three surfaces 22 adjacent to each other. In other words, each of the corner surfaces 24 includes a curved surface at a position at which three boundary surfaces 23 intersect each other. That is, the corner surface 24 includes a curved surface formed by, for example, a vertex among three adjacent surfaces 22 being R-chamfered.

The eight corner surfaces 24 are identified as a first corner surface 24A, a second corner surface 24B, . . . , and an eighth corner surface 24H. The first corner surface 24A is the boundary portion among the first surface 22A, the second surface 22B, and the fifth surface 22E. In addition, the first corner surface 24A is disposed at a position at which the first boundary surface 23A, the fifth boundary surface 23E, and the sixth boundary surface 23F intersect each other.

The second corner surface 24B is the boundary portion among the third surface 22C, the fourth surface 22D, and the fifth surface 22E. In addition, the second corner surface 24B is disposed at a position at which the second boundary surface 23B, the seventh boundary surface 23G, and the eighth boundary surface 23H intersect each other.

A third corner surface 24C is the boundary portion among the first surface 22A, the fourth surface 22D, and fifth surface 22E. The third corner surface 24C is disposed at a position at which the third boundary surface 23C, the fifth boundary surface 23E, and the eighth boundary surface 23H intersect each other.

A fourth corner surface 24D is the boundary portion among the second surface 22B, the third surface 22C and the fifth surface 22E. In addition, the fourth corner surface 24D is disposed at a position at which the fourth boundary surface 23D, the sixth boundary surface 23F, and the seventh boundary surface 23G intersect each other.

As illustrated in FIG. 2, a fifth corner surface 24E is the boundary portion among the first surface 22A, the second surface 22B, and the sixth surface 22F. In addition, the fifth corner surface 24E is disposed at a position at which the first boundary surface 23A, the ninth boundary surface 23I, and the tenth boundary surface 23J intersect each other.

A sixth corner surface 24F is the boundary portion among the third surface 22C, the fourth surface 22D, and the sixth surface 22F. In addition, the sixth corner surface 24F is disposed at a position at which the second boundary surface 23B, the eleventh boundary surface 23K, and the twelfth boundary surface 23L intersect each other.

A seventh corner surface 24G is the boundary portion among the first surface 22A, the fourth surface 22D, and the sixth surface 22F. The seventh corner surface 24G is disposed at a position at which the third boundary surface 23C, the ninth boundary surface 23I, and the twelfth boundary surface 23L intersect each other.

The eighth corner surface 24H is the boundary portion among the second surface 22B, the third surface 22C, and the sixth surface 22F. In addition, the eighth corner surface 24H is disposed at a position at which the fourth boundary surface 23D, the tenth boundary surface 23J, and the eleventh boundary surface 23K intersect each other.

Figure 3:
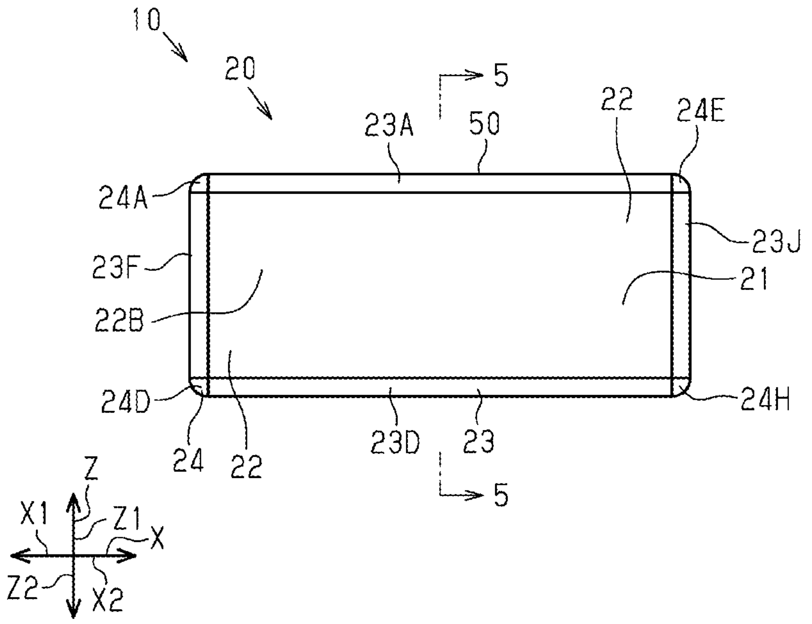
FIG. 3 is a side view of the electronic component.

As illustrated in FIG. 3, in the base body 20, the dimension in the direction of the first axis X is greater than the dimension in the direction of the third axis Z. In addition, as illustrated in FIG. 1, in the base body 20, the dimension in the direction of the first axis X is greater than the dimension in the direction of the second axis Y. In addition, the material of the base body 20 is a composite material including metal powder and a resin material.

Figure 4:
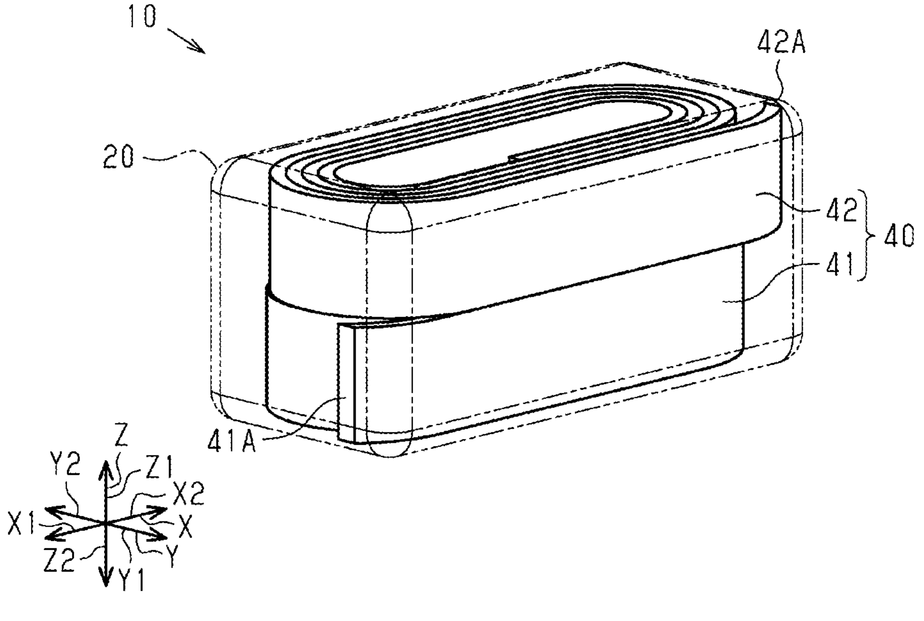
FIG. 4 is a transparent perspective view illustrating the internal structure of the electronic component.

As illustrated in FIG. 4, the electronic component 10 has inductor wiring 40. The inductor wiring 40 is embedded in the base body 20. It should be noted that FIG. 4 illustrates the internal structure of the base body 20 as viewed through the base body 20.

The inductor wiring 40 includes wiring made of a conductive material, such as silver or copper, and an insulating film covering the wiring. The inductor wiring 40 includes first wiring 41 and second wiring 42.

The first wiring 41 is strip-shaped. That is, the first wiring 41 is quadrangular in sectional view orthogonal to the direction in which the first wiring 41 extends. A first outer end 41A of the first wiring 41 is exposed from the fifth surface 22E. When the first wiring 41 is viewed in the third negative direction Z2, the first wiring 41 extends spirally counterclockwise from the outside to the inside along the path from the first outer end 41A to the inner end on the opposite side. One main surface of the first wiring 41 faces the center of the spiral.

The second wiring 42 is strip-shaped. That is, the second wiring 42 is quadrangular as viewed in sectional view orthogonal to the direction in which the second wiring 42 extends. The second wiring 42 is located in the third positive direction Z1 as viewed from the first wiring 41. A second outer end 42A of the second wiring 42 is exposed from the sixth surface 22F. When the second wiring 42 is viewed in the third negative direction Z2, the second wiring 42 extends spirally clockwise from the outside to the inside. The center of the spiral of the second wiring 42 substantially coincides with the center of the spiral of the first wiring 41. When the second wiring 42 is viewed in the third negative direction Z2, the second wiring 42 extends spirally clockwise from the outside to the inside along the path from the second outer end 42A to the inner end on the opposite side. In addition, one main surface of the second wiring 42 faces the center of the spiral. The inner end of the second wiring 42 is electrically connected to the inner end of the first wiring 41.

As illustrated in FIG. 2, the electronic component 10 includes a first outer electrode 61 and a second outer electrode 62. The first outer electrode 61 covers an outer surface 21 portion of the base body 20 that includes the fifth surface 22E. Specifically, as illustrated in FIGS. 1 and 2, the first outer electrode 61 covers the fifth surface 22E of the base body 20, a part of the third surface 22C, and the seventh boundary surface 23G. The first outer electrode 61 is electrically connected to the first outer end 41A of the first wiring 41 of the inductor wiring 40.

The material of the first outer electrode 61 is a conductive material. In the present embodiment, although not illustrated, the first outer electrode 61 has a three-layer structure including copper plating, nickel plating, and tin plating.

The second outer electrode 62 covers an outer surface 21 portion of the base body 20 that includes the sixth surface 22F. Specifically, as illustrated in FIG. 2, the second outer electrode 62 covers the sixth surface 22F, a part of the third surface 22C, and the eleventh boundary surface 23K of the base body 20. The second outer electrode 62 is electrically connected to the second outer end 42A of the second wiring 42 of the inductor wiring 40.

The material of the second outer electrode 62 is a conductive material. In the present embodiment, although not illustrated, the second outer electrode 62 has a three-layer structure including copper plating, nickel plating, and tin plating.

The second outer electrode 62 does not reach the first outer electrode 61 on the third surface 22C and is spaced apart from the first outer electrode 61 in the direction of the first axis X. It should be noted that, in FIGS. 1 and 2, the first outer electrode 61 and the second outer electrode 62 are illustrated with dots.

As illustrated in FIG. 3, the electronic component 10 has an insulating film 50. The insulating film 50 covers an outer surface 21 portion of the base body 20 that is not covered with the first outer electrode 61 and the second outer electrode 62. It should be noted that, in FIGS. 1 to 3, reference numerals are assigned on the assumption that the surface of the insulating film 50 is identical to the outer surface 21 of the base body 20.

The material of the insulating film 50 is an insulating substance. The material of the insulating film 50 is, for example, a mixture of a resin material and metal oxide microparticles. In the present embodiment, the insulating film 50 contains silicon dioxide as metal oxide microparticles and epoxy resin as an organic resin.

(First Average Dimension)

Next, a method of calculating a first average dimension AD1 will be described. The first average dimension AD1 is the average value of the thickness dimension from the first boundary surface 23A to the surface of an insulating film 50 portion covering the first boundary surface 23A. That is, the first average dimension AD1 is the average value of the distance in the direction orthogonal to the tangent to the first interface 23A from the first boundary surface 23A to the surface of the insulating film 50 portion covering the first interface 23A.

Figure 5:
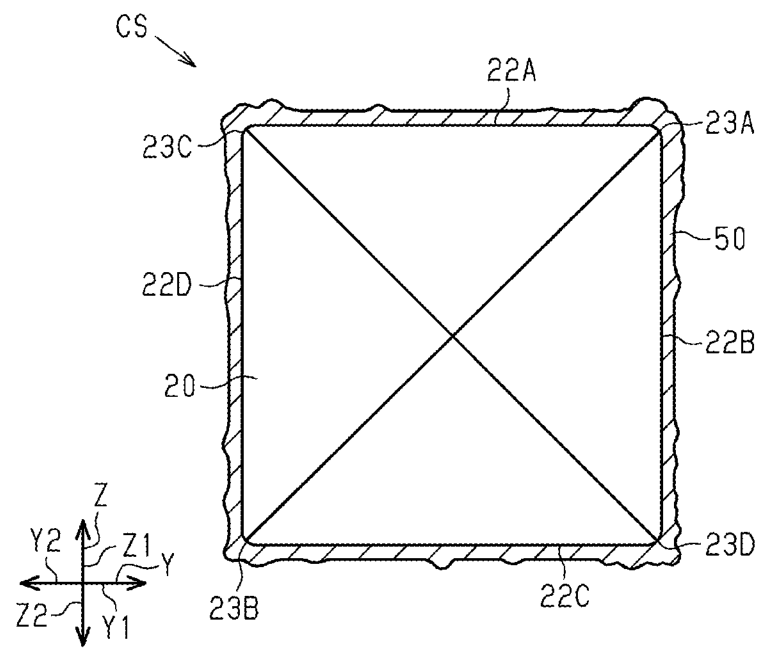
FIG. 5 is a sectional view taken along line 5-5 in FIG. 3.
Figure 6:
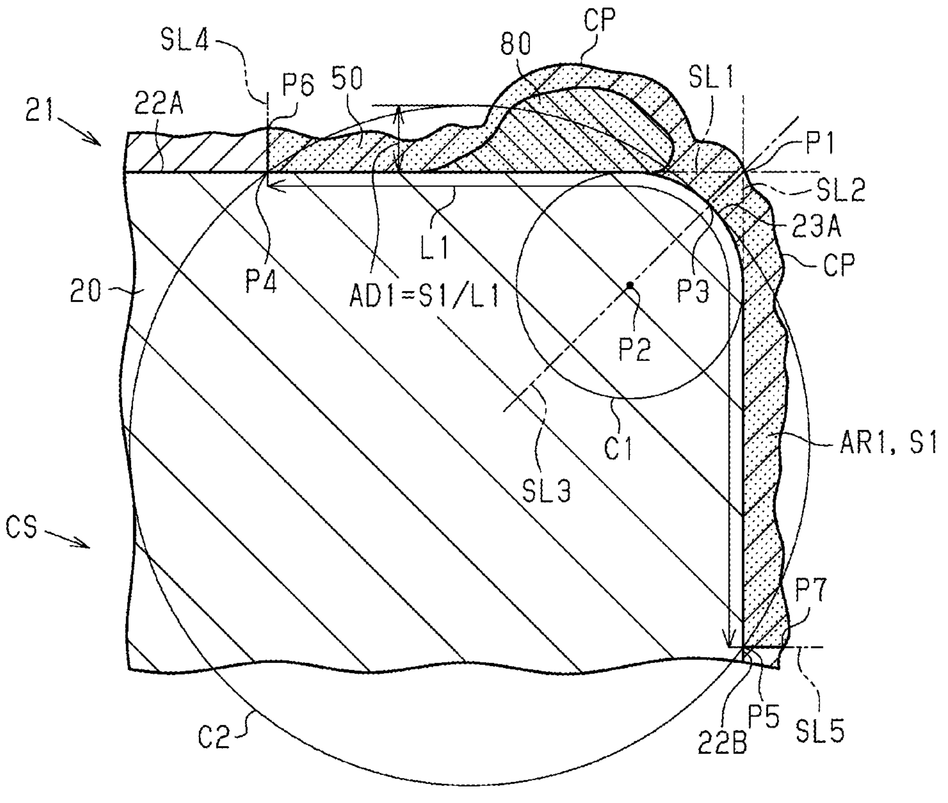
FIG. 6 is an enlarged sectional view of the electronic component.

As illustrated in FIG. 5, first, a cross section CS that includes the middle of the base body 20 in the direction of the first axis X and that is orthogonal to the first axis X is photographed with an electron microscope. Then, as illustrated in FIG. 6, a first length L1, which is the length of the first boundary surface 23A, is first measured in the cross section CS before the first average dimension AD1 is calculated. It should be noted that the internal structure of the base body 20 is not illustrated in FIGS. 5 and 6.

In measurement of the first length L1, first, a first circle C1 containing the curved portion of the first boundary surface 23A is drawn in the cross section CS. In this case, a part of the first circle C1 coincides with the curved portion of the first boundary surface 23A. Next, in the cross section CS, a first intersection point P1 at which a straight line SL1 extending along the first surface 22A intersects a straight line SL2 extending along the second surface 22B is determined. Next, a straight line SL3 that connects a center point P2 of the first circle C1 and the first intersection point P1 to each other is drawn. Next, a second intersection point P3 at which the straight line SL3 intersects the first circle C1 is determined.

Next, a second circle C2 in which the first circle C1 is inscribed is drawn. The second circle C2 is drawn so as to be in contact with the first circle C1 at the second intersection point P3. At this time, the center of the second circle C2 is present on the straight line SL3. Furthermore, the diameter of the second circle C2 is three times the diameter of the first circle C1.

Next, a third intersection point P4 at which the second circle C2 intersects the first surface 22A is determined. In addition, a fourth intersection point P5 at which the second circle C2 intersects the second surface 22B is determined. Then, in the cross section CS, the length of the portion extending along the outer surface 21 of the base body 20 from the third intersection point P4 to the fourth intersection point P5 is defined as a first length L1, which is the length of the first boundary surface 23A.

Next, in the cross section CS, a fifth intersection point P6 at which a straight line SL4 extending in the third positive direction Z1 from the third intersection point P4 intersects the surface of the insulating film 50 is determined. In addition, a sixth intersection point P7 at which a straight line SL5 extending in the second positive direction Y1 from the fourth intersection point P5 intersects the surface of the insulating film 50 is determined.

Next, in the cross section CS, a sectional area S1 of a first range AR1 demarcated by the line from the third intersection point P4 to the fourth intersection point P5 along the outer surface 21, the straight line SL4, the straight line SL5, and the line from the fifth intersection point P6 to the sixth intersection P7 along the surface of the insulating film 50 is calculated by image processing. Then, the first average dimension AD1 is calculated by dividing the sectional area S1 by the first length L1.

It should be noted that the first range AR1 includes the powder and granular body 80 in addition to the insulating film 50. That is, the powder and granular body 80 is located between the first boundary surface 23A and the surface of the insulating film 50 portion covering the first boundary surface 23A. As described above, the electronic component 10 has the powder and granular body 80. The material of the powder and granular body 80 is identical to the material of the base body 20.

In addition, the surface of the insulating film 50 portion covering the first boundary surface 23A has a plurality of curved surface portions CP that project away from the base body 20. For example, as illustrated in FIG. 6, the plurality of curved surface portions CP are located in the cross section CS. In addition, although not illustrated, the plurality of curved surface portions CP are also arranged in the direction of the first axis X.

(Second Average Dimension)

A method of calculating a second average dimension AD2 will be described. The second average dimension AD2 is the average value of the thickness dimension from the first surface 22A to the surface of an insulating film 50 portion covering the first surface 22A. That is, the second average dimension AD2 is the average value of the distance in the direction orthogonal to the first surface 22A from the first surface 22A to the surface of the insulating film 50 portion covering the first surface 22A. The second average dimension AD2 is measured in the cross section CS as the first average dimension AD1.

Figure 7:
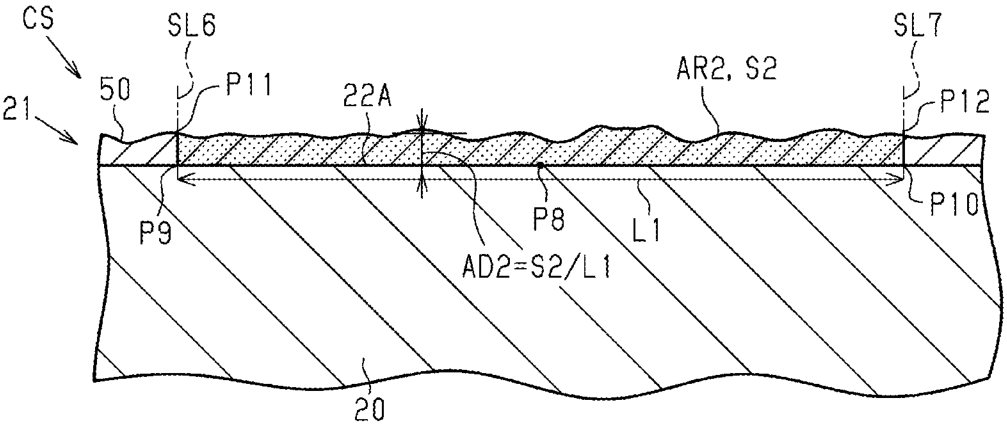
FIG. 7 is an enlarged sectional view of the electronic component.

As illustrated in FIG. 7, first, a middle point P8 that is the middle of the first surface 22A in the direction of the second axis Y is determined in the cross section CS. Next, the point that shifts in the second positive direction Y1 from the middle point P8 by half the first length L1 along the outer surface 21 of the base body 20 is defined as a starting point P9. In addition, the point that shifts in the second negative direction Y2 from the middle point P8 by half the first length L1 along the outer surface 21 of the base body 20 is defined as an end point P10.

Next, in the cross section CS, a seventh intersection point P11 at which a straight line SL6 that passes through the start point P9 and extends in the third positive direction Z1 intersects the surface of the insulating film 50 is determined. In addition, an eighth intersection point P12 at which a straight line SL7 extending in the third positive direction Z1 from the end point P10 intersects the surface of the insulating film 50 is determined.

Next, in the cross section CS, a sectional area S2 of a second range AR2 demarcated by the line from the start point P9 to the end point P10 along the outer surface 21, the straight line SL6, the straight line SL7, and the line from the seventh intersection point P11 to the eighth intersection P12 along the surface of the insulating film 50 is calculated by image processing. Then, the second average dimension AD2 is calculated by dividing the sectional area S2 by the first length L1.

The first average dimension AD1 calculated as described above is greater than the second average dimension AD2. In particular, the first average dimension AD1 is equal to or greater than 1.03 times the second average dimension AD2. It should be noted that the first average dimension AD1 is preferably equal to or greater than 1.10 times the second average dimension AD2 and equal to or less than 3.00 times the second average dimension AD2.

In addition, the average dimension of each of the second surface 22B to the fourth surface 22D calculated in the same manner as the second average dimension AD2 is substantially the same as the second average dimension AD2. Furthermore, the average dimension of each of the second boundary surface 23B to the fourth boundary surface 23D calculated in the same manner as the first average dimension AD1 is greater than the second average dimension AD2, as in the first average dimension AD1.

Accordingly, the average value of the thickness dimension from the second boundary surface 23B to the surface of an insulating film 50 portion covering the second boundary surface 23B is defined as a third average dimension, and the average value of the thickness dimension from the third surface 22C to the surface of an insulating film 50 portion covering the third surface 22C is defined as a fourth average dimension. At this time, the third average dimension is greater than the fourth average dimension.

In addition, the average dimension of each of the fifth boundary surface 23E, the sixth boundary surface 23F, the eighth boundary surface 23H to the tenth boundary surface 23J, and the twelfth boundary surface 23L calculated in the same manner as the first average dimension AD1 is greater than the second average dimension AD2, as in the first average dimension AD1. That is, the average dimensions of the boundary surfaces covered with the insulating film 50 calculated in the same manner as the first average dimension AD1 are greater than the second average dimension AD2.

The average value of the thickness dimension from the first corner surface 24A to the surface of an insulating film 50 portion covering the first corner surface 24A is defined as a fifth average dimension. Here, the first corner surface 24A is disposed at a position at which the first boundary surface 23A, the fifth boundary surface 23E, and the sixth boundary surface 23F intersect each other. In addition, the average dimension of the insulating film 50 for each of the first boundary surface 23A, the fifth boundary surface 23E, and the sixth boundary surface 23F is greater than the second average dimension AD2. Accordingly, the fifth average dimension is greater than the second average dimension AD2. Furthermore, the fifth average dimension is greater than the first average dimension AD1. In addition, the average value of the thickness dimension from each of the second corner surface 24B to the eighth corner surface 24H to the surface of the insulating film 50 is greater than the second average dimension AD2 and greater than the first average dimension AD1. That is, the average value of the thickness dimension from each of the corner surfaces covered with the insulating film 50 to the surface of the insulating film 50 is greater than the first average dimension AD1.

(Method of Manufacturing the Electronic Component)

Figure 8:
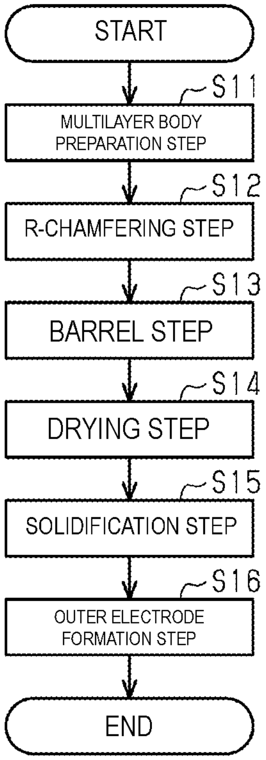
FIG. 8 is an explanatory diagram for describing a method of manufacturing the electronic component.

As illustrated in FIG. 8, a method of manufacturing the electronic component 10 includes a multilayer body preparation step S11, an R-chamfering step S12, a barrel step S13, a drying step S14, a solidification step S15, and an outer electrode formation step S16.

First, before the base body 20 is formed, a multilayer body that is the base body 20 without the boundary surface 23 and the corner surface 24 is prepared in the multilayer body preparation step S11. That is, the multilayer body is a rectangular parallelepiped having six surfaces 22. For example, first, a metal paste including a conductive material that becomes the inductor wiring 40 and a resin paste including metal powder and a resin material that becomes the base body 20 are printed and laminated sequentially. This processing is repeated to form a block body containing a plurality of multilayer bodies. After being fired, the block body is separated into individual pieces to prepare rectangular parallelepiped multilayer bodies. Alternatively, for example, the multilayer body may be prepared by embedding the coil-shaped inductor wiring 40 in a core obtained by molding the metal powder that becomes the base body 20 into a rectangular parallelepiped shape. Furthermore, for example, a rectangular parallelepiped multilayer body may be prepared by embedding a plurality of pieces of coil-shaped inductor wiring 40 in a sheet containing metal powder and a resin material, solidifying the sheet, and separating the sheet into individual pieces. It should be noted that the first outer end 41A and the second outer end 42A of the inductor wiring 40 are exposed to some portions of the surface of the multilayer body.

Next, the R-chamfering step S12 for forming the boundary surfaces 23 and the corner surfaces 24 on the multilayer body is performed. In the R-chamfering step S12, the boundary surfaces 23 having curved surfaces and the corner surfaces 24 having curved surfaces are formed by R-chamfering the vertices of the multilayer body by using, for example, sandblasting. As a result, the base body 20 is formed. In addition, a part of a ceramic sheet of the multilayer body is attached to the surface of the base body 20 as the powder and granular body 80.

Next, the barrel step S13 is performed. In the barrel step S13, a plurality of base bodies 20 are put in the drum, and the drum is rotated so as not to be subjected to an excessively strong impact. In addition, a coating liquid that becomes the insulating film 50 is injected with a spray. In the present embodiment, the coating liquid contains a silicon dioxide filler that becomes metal oxide microparticles and an epoxy resin as an organic resin. It takes some time for the coating liquid to solidify. Accordingly, the base bodies 20 collide with each other with the coating liquid incompletely solidified, that is, with a highly tacky coating composition attached to the surface of the base bodies 20. At this time, a part of the coating composition is removed from a base body 20 and transferred to the outer surface of another base body 20. The probability of collision between the boundary surface 23 projecting outward and the corner surfaces 24 projecting outward or the probability of collision between the planar surface 22 and the boundary surface 23 or the corner surface 24 is greater than the probability of collision between the planar surfaces 22. Accordingly, as the base bodies 20 repeatedly collide with each other, the amount of the coating composition transferred to the boundary surfaces 23 and the corner surfaces 24 becomes larger than the amount transferred to the surfaces 22.

Next, the drying step S14 for drying the base body 20 coated with the coating liquid is performed. Specifically, the application of the coating liquid within the drum is stopped. This dries the coating composition such that the coating composition enters a less tacky state, that is, a state in which the coating liquid is prevented from adhering to other objects.

Next, the solidification step S15 for solidifying the coating liquid to form the insulating film 50 is performed. The base body 20 coated with the coating liquid is removed from the drum and is subjected to heat treatment to solidify the coating liquid.

Next, the outer electrode formation step S16 for forming the first outer electrode 61 and the second outer electrode 62 is performed. First, a part of the insulating film 50 is removed by irradiating, with a laser, the region of the outer surface 21 of the base body 20 in which the first outer electrode 61 and the second outer electrode 62 are formed. Specifically, of the outer surface 21 parts of the base body 20, the fifth surface 22E, the seventh boundary surface 23G, a part of the seventh boundary surface 23G close to the third surface 22C, the sixth surface 22F, the eleventh boundary surface 23K, and a part of the third surface 22C close to an eleventh boundary surface 23K is irradiated with a laser.

Next, the first outer electrode 61 and the second outer electrode 62 are formed in the laser-irradiated region by a plating method. As a result, the first outer electrode 61 and the second outer electrode 62 are formed on an outer surface 21 portion of the base body 20 that is not covered with the insulating film 50.

Operation of the Embodiment

In the structure describe above, the surface parts of the insulating film 50 that cover the boundary surfaces 23 are more likely to collide with other objects, such as jigs or other electronic components, than the surface parts covering the surfaces 22. For example, the surface parts may collide with jigs or another base body 20 after the solidification step S15 until the outer electrode formation step S16. In addition, after the outer electrode formation step S16, an area not covered with the first outer electrode 61 and the second outer electrode 62 may collide with another object.

Effect of the Embodiment (1) In the embodiment described above, the first average dimension AD1, which is the thickness of the portion covering the first boundary surface 23A, is greater than the second average dimension AD2, which is the thickness of the portion covering the first surface 22A. Accordingly, the protective effect of the insulating film 50 on the first boundary surface 23A is greater than the protective effect on the first surface 22A. Therefore, even when a surface portion of the insulating film 50 that covers the first boundary surface 23A collides with another object, the impact force does not easily reach the base body 20. As a result, the first boundary surface 23A of the base body 20 can be suppressed from being damaged.

(2) In the embodiment described above, the powder and granular body 80 is present between the first boundary surface 23A and the surface of an insulating film 50 portion covering the first boundary surface 23A. Accordingly, when the surface of the insulating film 50 is subjected to an impact, the impact force is easily distributed by the interface between the powder and granular body 80 and the insulating film 50. Accordingly, the impact force from the surface of the insulating film 50 can be suppressed from being locally transferred to a part of the base body 20.

(3) In the embodiment described above, the material of the powder and granular body 80 is identical to the material of the base body 20. Accordingly, as in the manufacturing method described above, fragments of the base body 20 generated by the R-chamfering step S12 can be adopted as the powder and granular body 80. Therefore, efforts for preparing special materials as the powder and granular body 80 can be saved. That is, there is no need to include the powder and granular body 80 in the insulating film 50.

(4) In the embodiment described above, the first average dimension AD1 is greater than the second average dimension AD2, and the third average dimension is also greater than the fourth average dimension. That is, the thickness of the portion covering a specific boundary surface 23 is great, and the thicknesses of the portions covering the plurality of boundary surfaces 23 are also great. Accordingly, the base body 20 can be protected not only from the impact force from the portion covering the first boundary surface 23A but also from the impact force from the portion covering the second boundary surface 23B.

(5) In addition, in the embodiment described above, the thicknesses of the portions covering any boundary surfaces 23 are greater than the thicknesses of the portions covering surfaces 22. Accordingly, even when the portion covering any boundary surface 23 is subjected to an impact, the base body 20 can be protected.

(6) In the embodiment described above, the fifth average dimension, which is the average value of the dimension from the first corner surface 24A to the surface of the insulating film 50 portion covering the first corner surface 24A is greater than the second average dimension AD2. Accordingly, the base body 20 can be suppressed from being damaged by the impact force from the first corner surface 24A, which is considered to be more likely to collide than the first boundary surface 23A.

(7) In the embodiment described above, the thicknesses of the portions covering any corner surfaces 24 are greater than the thicknesses of insulating film 50 portions covering the surfaces 22. Accordingly, the base body 20 can be suppressed from being damaged by an impact force from the corner surface 24, which is considered to be most likely to collide with other objects.

(8) In the embodiment described above, the first average dimension AD1 is equal to or greater than 1.03 times the second average dimension AD2. Accordingly, in the portion covering the first boundary surface 23A, the magnitude of impact force that can be reduced is considerably greater than that of the portion covering the first surface 22A.

(9) In the embodiment described above, the insulating film 50 includes metal oxide microparticles. Accordingly, when the insulating film 50 is thin, an impact force is easily transferred to the base body 20. As described above, in the electronic component 10 including a material that cannot sufficiently reduce the impact force as the material of the insulating film 50, adoption of the structure in which the first average dimension AD1 is greater than the second average dimension AD2 is particularly preferable to suppress cracks and chips in the base body 20.

(10) In the embodiment described above, the material of the base body 20 is a composite material including metal powder and a resin material. Accordingly, the base body 20 is more likely to be damaged by an external impact. In the electronic component 10 including a material that is susceptible to cracks and chips as the material of the base body 20 as described above, the structure in which the first average dimension AD1 is greater than the second average dimension AD2 is particularly preferable.

(11) In the embodiment described above, the surface of the insulating film 50 portion covering the first boundary surface 23A has the plurality of curved surface portions CP that project away from the base body 20. When the portion covering the first boundary surface 23A collides with another object, the curved surface portion CP that projects away from the base body 20 is likely to collide. Accordingly, the protective effect can be obtained by increasing the first average dimension AD1 without increasing the thickness of the entire surface portion of the insulating film 50 that covers the first boundary surface 23A.

Other Embodiments

The embodiment describe above can be changed and practiced as described below. The embodiment described above and the modifications described below can be practiced in combination within a technically consistent range.

In the embodiment described above, the electronic component 10 is not limited to a power inductor component. For example, the electronic component 10 may be a thermistor component or a multilayer capacitor component.

The material of the base body 20 is not limited to the example in the embodiment described above. The material of the base body 20 may be a ceramic.

The shape of the base body 20 is not limited to the example in the embodiment described above. For example, the base body 20 may has a polygonal column shape having the central axis CA other than the square column shape. In addition, the base body 20 may also be the core of a wire-wound inductor component. For example, the core may have a so-called drum core shape. Specifically, the core may have a columnar winding core and flange portions provided at the end portions of the winding core. In this case, each of the boundary surfaces 23 is present in a portion in which the inner angle of the base body 20 among the angles formed by adjacent surfaces 22 is less than 180 degrees.

The outer surface 21 of the base body 20 need not have the corner surfaces 24 having curved surfaces. For example, when the boundary of the adjacent surfaces 22 of the outer surface 21 of the base body 20 is not chamfered, the boundary has no curved surface. Accordingly, the corner surface 24 including a curved surface may not be present at a position at which three boundaries described above intersect each other.

As long as the outer surface 21 has the first surface 22A, the second surface 22B, and the first boundary surface 23A having a curved surface, the other surfaces may have any shapes. For example, the third surface 22C to the sixth surface 22F may be curved surfaces, and the boundary portions excluding the first boundary surface 23A among the boundary portions between adjacent surfaces 22 need not have curved surfaces. For example, when the boundary between adjacent surfaces 22 has been C-chamfered, the boundary portion does not have a curved surface.

The insulating film 50 portion covering the first boundary surface 23A need not have the plurality of curved surface portions CP. For example, the film thickness of the insulating film 50 portion covering first boundary surface 23A may be uniform and greater than the film thickness of the insulating film 50 portion covering the first surface 22A.

The range of the first boundary surface 23A in the embodiment described above is only an example. The first boundary surface 23A may have any range as long as the first boundary surface 23A is defined as a region including the entire curved portion of the boundary portion between the first surface 22A and the second surface 22B. That is, in the example illustrated in FIG. 6, the first length L1 need only include the curved portion of the boundary between the first surface 22A and the second surface 22B. In the example illustrated in FIG. 6, when the diameter of the second circle C2 is identical to the diameter of the first circle C1, the first length L1 includes only the curved portion of the boundary between the first surface 22A and the second surface 22B. In addition, in the embodiment described above, the diameter of the second circle C2 can be changed to one or more times the diameter of the first circle C1, as appropriate. However, the diameter of the second circle C2 need be determined such that the first range AR1 and the second range AR2 do not overlap each other. This also applies to the other boundary surfaces 23.

It should be noted that, as described above, since the boundary portion between the adjacent surfaces 22 of the base body 20 is more likely to collide with another base body 20 than a planar portion in the manufacturing process, the thickness of the portion covering the boundary portion easily becomes large. Accordingly, the shorter the first length L1, that is, the smaller the planar portion of the boundary surface 23, the more the first average dimension AD1 is likely to become greater than the second average dimension AD2.

The method of calculating the first average dimension AD1 in the embodiment is an example and can be changed. For example, in the cross section CS, a plurality of points are randomly identified on the boundary surface 23. A tangent line is drawn at each of the identified points, and an orthogonal line orthogonal to the tangent line is drawn. The average value in the thickness direction from the boundary surface 23 to the surface of the insulating film 50 in this orthogonal line may be the first average dimension AD1. Similarly, the method of calculating the second average dimension AD2 can also be changed.

In the embodiment described above, the inductor wiring 40 need only give inductance to the electronic component 10 that is an inductor component by generating a magnetic flux in the base body 20 when current flows.

For example, the shape of the inductor wiring 40 is not limited to the example in the embodiment described above. Specifically, the inductor wiring 40 may have a spiral shape, a straight-line shape, or a meandering shape.

In addition, for example, the inductor wiring 40 may be wiring that is formed of only a conductive material and has no insulating coating. Furthermore, for example, the positions at which the first outer end 41A and the second outer end 42A of the inductor wiring 40 exposed from the base body 20 can be changed as appropriate. For example, both the first outer end 41A and the second outer end 42A may be exposed from the third surface 22C.

The position at which the first outer electrode 61 is disposed is not limited to the example in the embodiment described above. For example, the first outer electrode 61 may be disposed on the fifth surface 22E, the fifth boundary surface 23E to the eighth boundary surface 23H, the first corner surface 24A to the fourth corner surface 24D, and some portions of the first surface 22A to the fourth surface 22D, or the first outer electrode 61 may be a so-called five-surface electrode. In addition, the position need only be changed as appropriate in accordance with the portions at which the first outer end 41A and the second outer end 42A of the inductor wiring 40 are exposed from the base body 20. This also applies to the second outer electrode 62.

The structure of the first outer electrode 61 is not limited to the example in the embodiment described above. For example, the first outer electrode 61 may include only nickel plating, may not include copper plating, or may include laminated plating layers of other metals.

The material of the insulating film 50 is not limited to the example in the embodiment described above. For example, the material of the metal oxide microparticles is not limited to a silicon dioxide, and may be a multi-component oxide including Si, such as a B—Si, Si—Zn, Zr—Si, or Al—Si oxide. Alternatively, the material of the metal oxide microparticles may be a multi-component oxide containing an alkali metal and Si, such as an Al—Si, Na—Si, K—Si, or Li—Si oxide. Alternatively, the material of the metal oxide microparticles may be a multi-component oxide containing an alkali earth metal and Si, such as an Mg—Si, Ca—Si, Ba—Si, or Sr—Si oxide. Alternatively, the metal oxide microparticles need not contain Si or may be a mixture of these oxides. Specifically, the material of the metal oxide microparticles may be a metal oxide, such as sodium oxide, calcium oxide, lithium oxide, boron oxide, potassium oxide, barium oxide, titanium oxide, zirconium oxide, aluminum oxide, zinc oxide, magnesium oxide, or a mixture of these oxides.

Alternatively, for example, the organic resin is not limited to an epoxy resin, and may be a phenolic resin, an acrylic resin, or an acrylic-modified polyurethane.

In addition, the material of the insulating film 50 may include only an organic resin. Alternatively, the material of the insulating film 50 may include, in addition to an organic resin, an antistatic agent or a surface preparation agent, such as a pigment or antistatic agents such as a pigment, a silicone flame retardant, a silane coupling agent, or a titanate coupling agent.

In the embodiment described above, the material of the powder and granular body 80 need not be identical to the material of the base body 20. For example, the material of the powder and granular body 80 may be identical to the material of an abrasive used in sandblasting in the R-chamfering step S12. That is, in the R-chamfering step S12, some of the abrasive attached to the surface of the base body 20 may become the powder and granular body 80. Furthermore, the powder and granular body 80 may be mixed with the coating liquid in advance.

In the embodiment described above, the powder and granular body 80 may be omitted. That is, the entire portion covering the outer surface 21 of the base body 20 may be the insulating film 50. In this case, for example, the entire first range AR1 may be occupied by the insulating film 50 or may be partly void.

In the embodiment described above, the first average dimension AD1 need only be greater than the second average dimension AD2 and may be less than 1.03 times the second average dimension AD2. It should be noted that, when the first average dimension AD1 is 1.10 times the second average dimension AD2 or greater, the magnitude of reduction of an impact force that can be reduced in the portion covering the first boundary surface 23A is greater than that in the portion covering the first surface 22A. In addition, when the first average dimension AD1 is 3.00 times or less the second average dimension AD2, the dimension of the entire electronic component 10 can be suppressed from becoming excessively large.

In the embodiment described above, the first average dimension AD1 need only be greater than the second average dimension AD2. Accordingly, the average dimension of each of the second boundary surface 23B to the fourth boundary surface 23D calculated in the same manner as the first average dimension AD1 may be equal to or less than the second average dimension AD2. In addition, the fifth average dimension may be equal to or less than the first average dimension.

REFERENCE SIGNS LIST

10 electronic component
20 base body
21 outer surface
22 surface
23 boundary surface
24 corner surface
40 inductor wiring
41 first wiring
42 second wiring
50 insulating film
61 first outer electrode
62 second outer electrode
71 first pass-through portion
72 second pass-through portion
80 powder and granular body

The invention claimed is:

1. An electronic component comprising:

a base body; and an insulating film covering an outer surface of the base body, wherein the outer surface has a first surface that is planar, a second surface that is adjacent to the first surface and extends in a direction different from a direction of the first surface, and a boundary surface including a curved surface at a boundary between the first surface and the second surface, an inner angle of the base body among angles formed by the first surface and the second surface is less than 180 degrees, and a first average dimension is greater than a second average dimension in a cross section orthogonal to the first surface and the second surface, wherein the first average dimension is an average value of a thickness dimension from the boundary surface to a surface of a first part of insulating film that covers the boundary surface, and the second average dimension is an average value of a thickness dimension from the first surface to a surface of a second part of the insulating film that covers the first surface.

2. The electronic component according to claim 1, further comprising:

a powder and granular body between the boundary surface and the surface of the first part of the insulating film that covers the boundary surface.

3. The electronic component according to claim 2, wherein a material of the powder and granular body is identical to a material of the base body.

4. The electronic component according to claim 1, wherein, when the boundary surface is a first boundary surface, the outer surface has a third surface that is planar, a fourth surface that is adjacent to the third surface and extends in a direction different from a direction of the third surface, and a second boundary surface including a curved surface at a boundary between the third surface and the fourth surface, the base body has a columnar shape having a central axis, the first surface, the second surface, the third surface, the fourth surface, the first boundary surface, and the second boundary surface extend parallel to the central axis, an inner angle of the base body among angles formed by the third surface and the fourth surface is less than 180 degrees, and a third average dimension is greater than a fourth average dimension, the third average dimension being an average value of a thickness dimension from the second boundary surface to a surface of a third part of the insulating film that covers the second boundary surface, and the fourth average dimension being an average value of a thickness dimension from the third surface to a surface of a fourth part of the insulating film that covers the third surface.

5. The electronic component according to claim 4, wherein the outer surface further includes a fifth surface that is adjacent to the first surface and the second surface and extends in a direction different from the direction of the first surface and the direction of the second surface, and a corner surface that is a boundary among the first surface, the second surface, and the fifth surface and includes a curved surface, an inner angle of the base body among angles formed by the fifth surface and the first surface is less than 180 degrees, an inner angle of the base body among angles formed by the fifth surface and the second surface is less than 180 degrees, and a fifth average dimension is greater than the second average dimension, the fifth average dimension being an average value of a thickness dimension from the corner surface to a surface of a fifth part of the insulating film that covers the corner surface.

6. The electronic component according to claim 1, wherein the first average dimension is equal to or greater than 1.03 times the second average dimension.

7. The electronic component according to claim 6, wherein the first average dimension is equal to or less than 3.00 times the second average dimension.

8. The electronic component according to claim 1, wherein the first average dimension is equal to or greater than 1.10 times the second average dimension.

9. The electronic component according to claim 8, wherein the first average dimension is equal to or less than 3.00 times the second average dimension.

10. The electronic component according to claim 1, wherein the insulating film includes a metal oxide microparticle and a resin material.

11. The electronic component according to claim 1, wherein the base body is made of a composite material of metal powder and a resin material.

12. The electronic component according to claim 1, wherein the surface of the first part of the insulating film that covers the boundary surface has a plurality of curved surface portions that project away from the base body.

* * * * *